United States Patent [19]

Matsui et al.

[11] Patent Number: 5,882,820
[45] Date of Patent: Mar. 16, 1999

[54] ANODE FOR NON-AQUEOUS ELECTROLYTE CELL AND METHOD OF MANUFACTURING THE SAME

[75] Inventors: Tooru Matsui, Fujiidera; Kenichi Takeyama, Osaka; Yasushi Nakagiri, Tsuzuki-gun; Tetsuya Kawai, Kadoma, all of Japan

[73] Assignee: Matsushita Electric Industrial Co., Ltd., Osaka-fu, Japan

[21] Appl. No.: 841,432

[22] Filed: Apr. 22, 1997

[30] Foreign Application Priority Data

Apr. 25, 1996 [JP] Japan .................................. 8-105797
Dec. 27, 1996 [JP] Japan .................................. 8-351657

[51] Int. Cl.$^6$ ..................................................... H01M 4/58
[52] U.S. Cl. ........................ 429/218; 264/104; 264/230; 264/239; 264/293; 264/299; 264/310; 264/319; 264/320; 29/746
[58] Field of Search ................................... 264/104, 230, 264/232, 239, 293, 294, 296, 299, 310, 319, 320; 429/218; 29/746

[56] References Cited

U.S. PATENT DOCUMENTS

| | | | |
|---|---|---|---|
| 4,670,214 | 6/1987 | Magnuson et al. | 264/104 |
| 4,915,985 | 4/1990 | Maxfield et al. | 264/104 |
| 5,077,152 | 12/1991 | Yoshino | 429/209 |

*Primary Examiner*—Bruce F. Bell
*Attorney, Agent, or Firm*—Panitch, Schwarze, Jacobs & Nadel, P.C.

[57] ABSTRACT

The present invention is directed to the provision of an anode for a non-aqueous electrolyte cell, which is excellent in rapid charge/discharge characteristics, discharge capacity characteristics at high temperatures, charge/discharge characteristics at low temperatures and shelf life, and thus has high reliability. According to the present invention, a sheet, mainly composed of an alkali metal having a body centered cubic crystal structure as an active material, is pressed from a direction normal to the principal surface thereof, thereby preferentially orienting crystallites so that (100) planes, (110) planes, (211) planes, (310) planes, (321) planes or (222) planes are parallel to the principal surface of the sheet, and the thus pressed sheet is used for the anode.

8 Claims, 10 Drawing Sheets

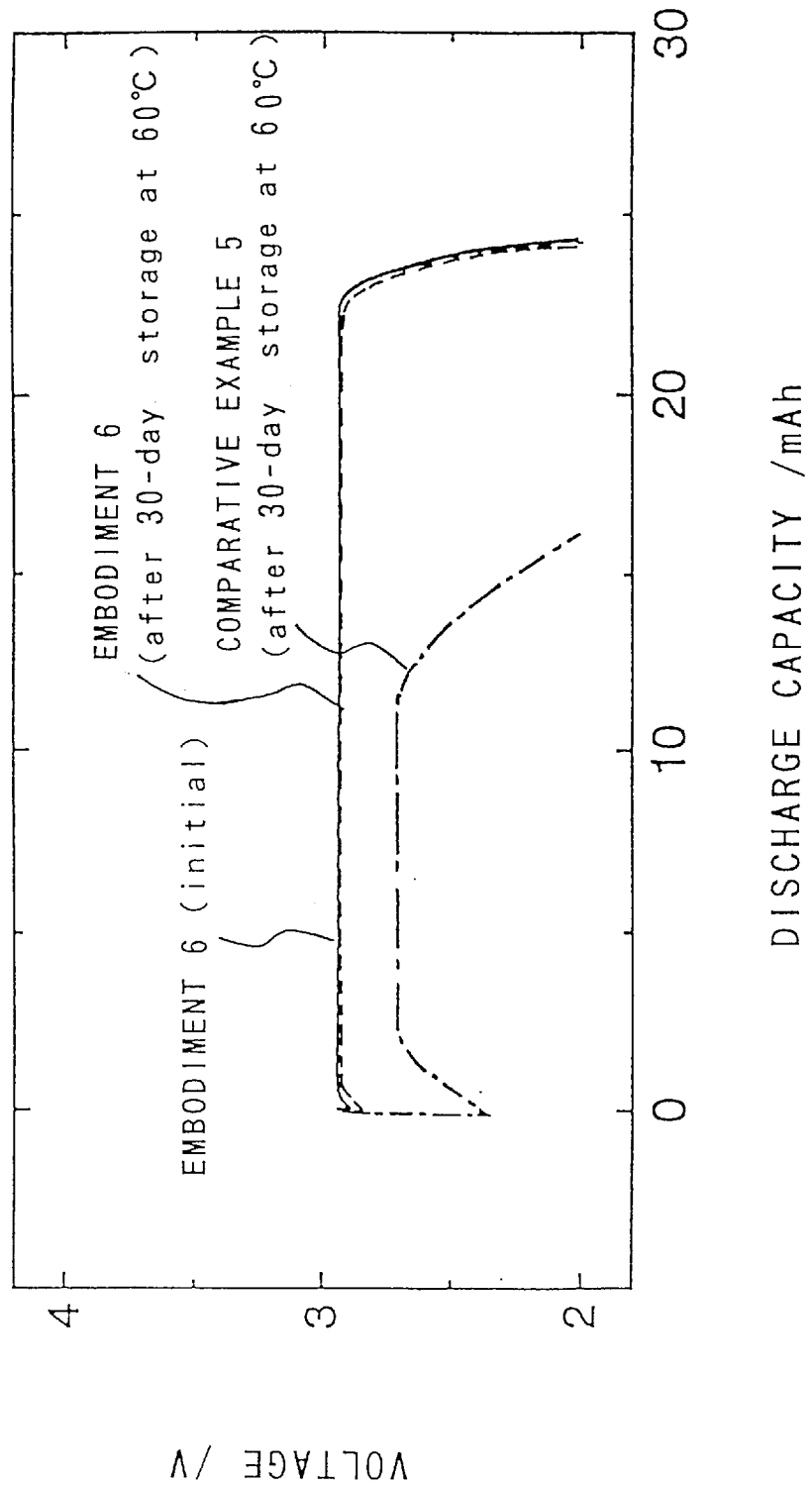

ANODE FOR NON-AQUEOUS ELECTROLYTE CELL AND METHOD OF MANUFACTURING THE SAME

BACKGROUND OF THE INVENTION

The present invention relates to a non-aqueous electrolyte cell, and more particularly to an improvement in an anode therefor.

A non-aqueous electrolyte cell which employs an alkali metal such as lithium for an anode active material, and an electrolyte composed of an organic solvent such as propylene carbonate, γ-butyrolactone, dimethoxyethane, tetrahydrofuran, dioxolane, etc. with $LiClO_4$, $LiBF_4$, $LiAsF_6$, $LiPF_6$, $LiCF_3SO_3$, etc. dissolved therein, has an advantage of providing high energy density. Because of this advantage, nowadays non-aqueous primary cells are used in small electronic appliances including watches and cameras, and non-aqueous secondary cells are used in portable apparatus such as portable telephones, portable personal computers, video movie recorders, etc.

The non-aqueous electrolyte cell is also characterized by long shelf life. This is because the alkali metal used as the anode active material reacts easily with electrolyte constituents owing to a high reactivity, thereby forming on the anode surface a passivating film which acts to suppress a reaction of self-discharge.

On the other hand, the alkali metal in a shape of tree branch, needle, fibril or similar appearance, generally known as dendrites, are deposited markedly on the anode surface during charging. This is because the passivating film acts to localize the deposition of the alkali metal in specific areas on the anode surface. Formation and subsequent growth of such dendrites has lead to a problem that the anode and a cathode are short-circuited internally. Furthermore, in a process of discharge, the dendrites are locally dissolved, resulting in discontinuities at various places and it becomes impossible to dissolve all of the alkali metal deposited during charging. This has lead to the further problem that the charge/discharge efficiency drops significantly.

To suppress the formation of such dendrites during charging, a charging method is proposed, for example, in "Progress in Batteries and Solar Cells," Vol. 2, p. 54, 1979, in which, when lithium is used as the alkali metal, an anode potential is maintained higher than −50 mV with respect to an $Li^+/Li$ electrode and the lithium is deposited under a mild condition at a current density held equal to or less than 0.3 $mAh/cm^2$. Another method, which is proposed in "Electrochimica Acta," Vol. 3, p. 1715, 1985, involves using a mixture of a high-dielectric-constant substance such as propylene carbonate and a low-viscosity substance such as dimethoxyethane for the solvent of the electrolyte, thereby suppressing the formation of the dendrites while improving the charge/discharge efficiency.

However, the former method involving charge control is inferior in efficiency and consequently requires a long charge time.

On the other hand, when a mixture of the high-dielectric-constant substance and the low-viscosity substance is used for the solvent of the electrolyte, as in the latter method, the formation of the dendrites in charge/discharge cycles is suppressed while retaining a low self-discharge characteristic at room temperature. This method, however, involves problems in terms of characteristics under severe conditions expected in actual usage, such as rapid charge/discharge characteristics, charge/discharge characteristics at high temperatures of 60° C. and above, shelf life at such high temperatures, or charge/discharge characteristics at low temperatures of −20° C. and below. The deterioration of rapid charge/discharge characteristics and the deterioration of various characteristics at high temperatures are both attributed to acceleration of a formation of the dendrites and reaction between the solvent and the alkali metal used as the anode active material. The deterioration of characteristics at low temperatures is due to such factors as the decrease in reaction efficiency.

The present invention is directed to overcome the above-mentioned problems, and to provide a highly reliable anode for a non-aqueous electrolyte cell which has long shelf life and cycle life even under severe environmental conditions.

BRIEF SUMMARY OF THE INVENTION

The present invention provides an anode for a non-aqueous electrolyte cell comprising an alkali metal sheet with a specific set of planes of crystallites thereof oriented parallel to the principal surface of the sheet.

An anode for a non-aqueous electrolyte cell, according to the present invention, comprises a sheet mainly of an alkali metal as an active material, wherein, of reflections obtained from an incident X-ray at an angle normal to the surface of the sheet, the peak intensity of one reflection selected from the group consisting of (200) reflection, (211) reflection, (310) reflection, (321) reflection and (222) reflection, accounts for 50% or more of a sum of the peak intensities of the reflections obtained from the incident X-ray.

Another anode for a non-aqueous electrolyte cell, according to the present invention, comprises a sheet mainly composed of an alkali metal as an active material, wherein the peak intensity of (110) reflection obtained from an incident X-rays incident at an angle normal to the surface of the sheet, accounts for 70% or more of a sum of the peak intensities of the reflections obtained from the incident X-ray.

A method of manufacturing an anode for a non-aqueous electrolyte cell in accordance with the present invention includes the step of pressing a sheet mainly composed of an alkali metal as an active material, from a direction normal to the surface thereof.

The method of manufacturing an anode for a non-aqueous electrolyte cell further includes the step of heat-treating the sheet for annealing at a temperature lower than the melting point of the alkali metal before or after the sheet is pressed. Alternatively, the heat treatment may be performed simultaneously with the pressing.

In the step of pressing the sheet, the method employed to apply a load to the sheet involves applying a static load for a predetermined time period, or passing the sheet through a gap between a pair of rollers arranged parallel to each other, or applying an impact load by using a hammer or the like.

Of alkali metals, lithium is the dominant material for the anode for a non-aqueous electrolyte cell. For the anode, a foil is widely used. In a case of lithium foils, since the foils are usually produced by injection molding, crystallites in the foil are not oriented in a specific direction but oriented in random directions. That is, among cut sheets in the same lot, the orientation of crystallites may be different from one sheet to another, or in some cases, even within the same sheet. When the X-ray diffraction patterns of several lithium foils were compared at the time of delivery, it was found that the intensity ratio of each peak was different from sample to sample and some samples had extremely low crystallinity. In this way, in untreated lithium foils, the orientation of crystallites is random, but when the lithium foil is treated by pressing or rolling, as described above, the crystallites in the foil can be oriented uniformly along a specific direction.

FIG. 1 shows an X-ray diffraction pattern of lithium metal in Joint Committee on Powder Diffraction Standard (hereinafter referred to as JCPDS) card number 150401 obtained by powder method. According to this diffraction pattern, (110) reflection, (200) reflection, (211) reflection, (220) reflection, (310) reflection, (222) reflection and (321) reflection are observed, and their peak intensity ratios are 42.9%, 12.9%, 17.1%, 8.6%, 8.6%, 1.3% and 8.6%, respectively. When these peak intensity ratios are taken as standard ratios, it can be deduced that when the peak intensity ratio is 70% or more for the (110) reflection and 50% or more for the other peaks, the crystallites in the lithium foil are substantially oriented so that a specific set of crystal planes, that is, the set of planes responsible for the applicable peak, is in parallel to a plane perpendicular to the incident direction of X-ray.

According to the present invention, in a sheet-like anode using an alkali metal as an active material, its crystallites can be oriented preferentially along a specific direction. By using this anode, it becomes possible to provide a highly reliable non-aqueous electrolyte cell which offers excellent characteristics in terms of rapid chargeability, quick dischargeability, charge/discharge efficiency and shelf life at high temperatures of 60° C. and above, or charge/discharge cycle life at low temperatures of −20° C. and below, thus being capable of withstanding severe conditions and retaining high efficiency over an extended period of time, and providing excellent charge/discharge cycle life.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 10 is a characteristic diagram showing a relation between a voltage of the same cell during discharge.

DETAILED DESCRIPTION OF THE INVENTION

The alkali metal used in the anode of the non-aqueous electrolyte cell is exemplified by lithium, but since any other alkali metal takes a body centered cubic structure as same as lithium, the same effects can be obtained if any alkali metal is used.

Hereafter, preferred embodiments of the present invention is explained with referring the attached drawings using lithium or a litium containing alloy as an anode material.

EMBODIMENT 1

A lithium foil with a thickness of 100 μm and a width of 22 mm was used as an active material.

Figure 1:
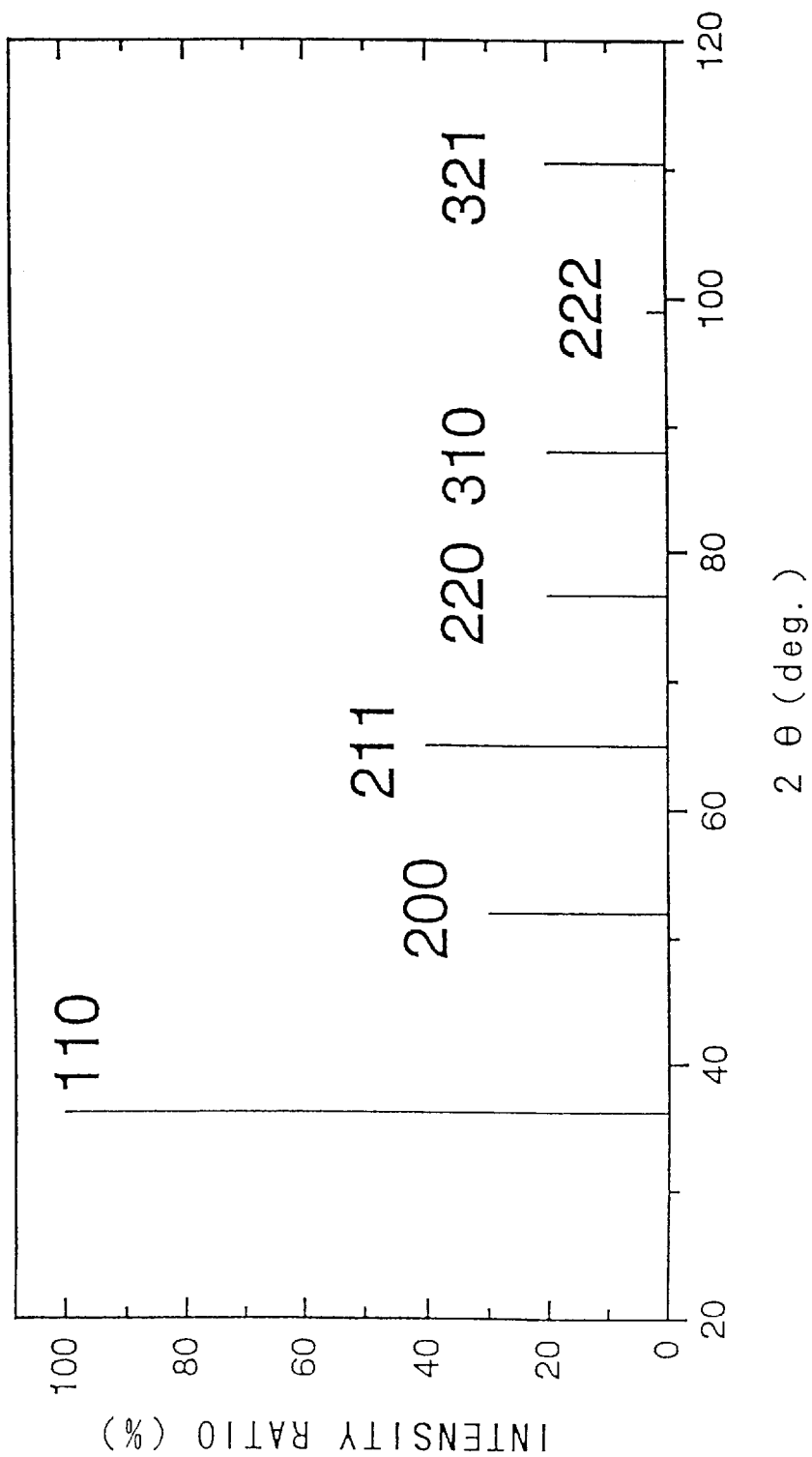
FIG. 1 is a lithium metal X-ray diffraction pattern according to JCPDS card (number 150401).
Figure 2:
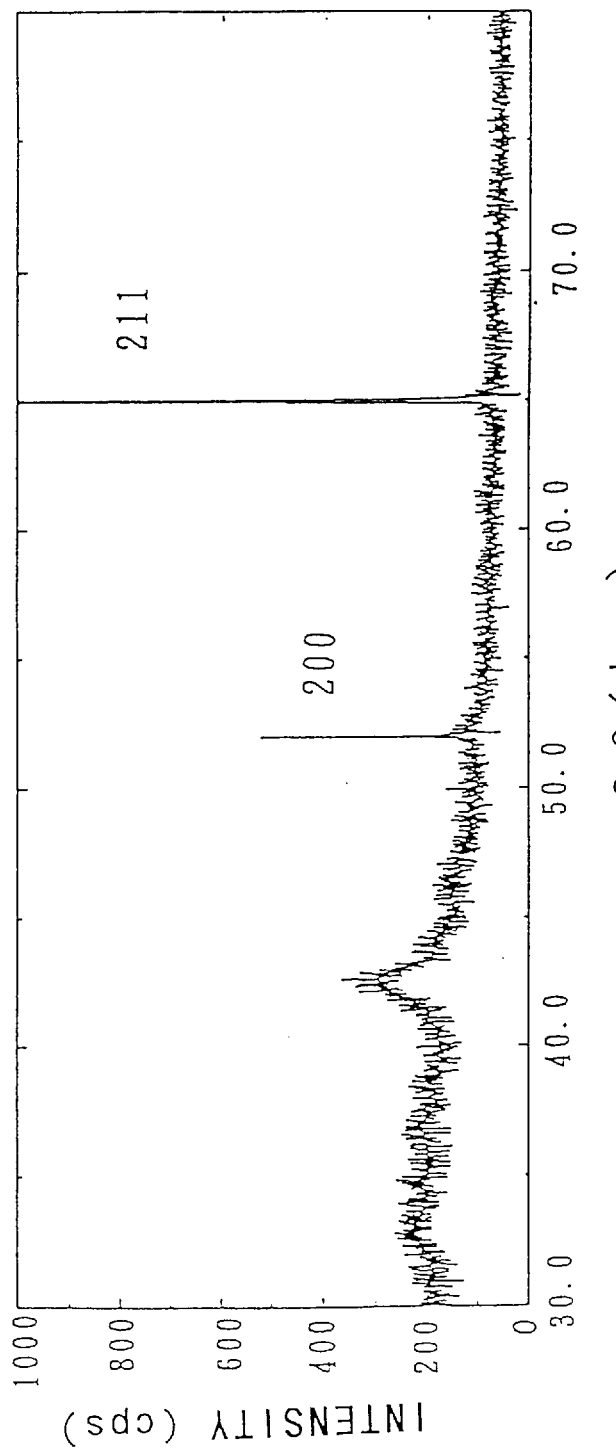
FIG. 2 is an X-ray diffraction pattern of an untreated lithium foil used for an anode of a cell in a comparative example.

Upon delivery, the lithium foil was subjected to an X-ray analysis. One example is shown in FIG. 2. This diffraction pattern is the one obtained by projecting CuKα rays onto the lithium foil at an angle normal to the principal surface of the lithium foil. According to the diffraction pattern, an intense reflection peak was obtained for (211) reflection. A broad peak observed at around 42 to 43 degrees was due to a polypropylene plate supporting the lithium foil. This diffraction pattern is clearly different from the diffraction pattern on the JCPDS (Joint Committee on Power Diffraction Standards) card shown in FIG. 1. That is, a peak of (110) reflection was not observed, and of course, its higher order reflection, (220) reflection, was not observed, either. Further, the peak intensity of the (211) reflection is somewhat greater than that of the (200) reflection. However, the peak intensity of the (211) reflection is less than 50% of the sum of all the reflections including those obtained in a higher angular region of 2θ=80° or larger (not shown), and the (211) planes are therefore not particularly oriented in parallel to the principal surface of the lithium foil.

The lithium foil exhibiting the diffraction pattern shown in this example was stamped into a circular shape of 16.8 mm diameter. Further, using a steel rod jig, its mirror-polished bottom face was pressed onto the lithium foil, thus pressing the lithium foil for 10 seconds with a pressure of 150 kgf/cm².

Figure 3:
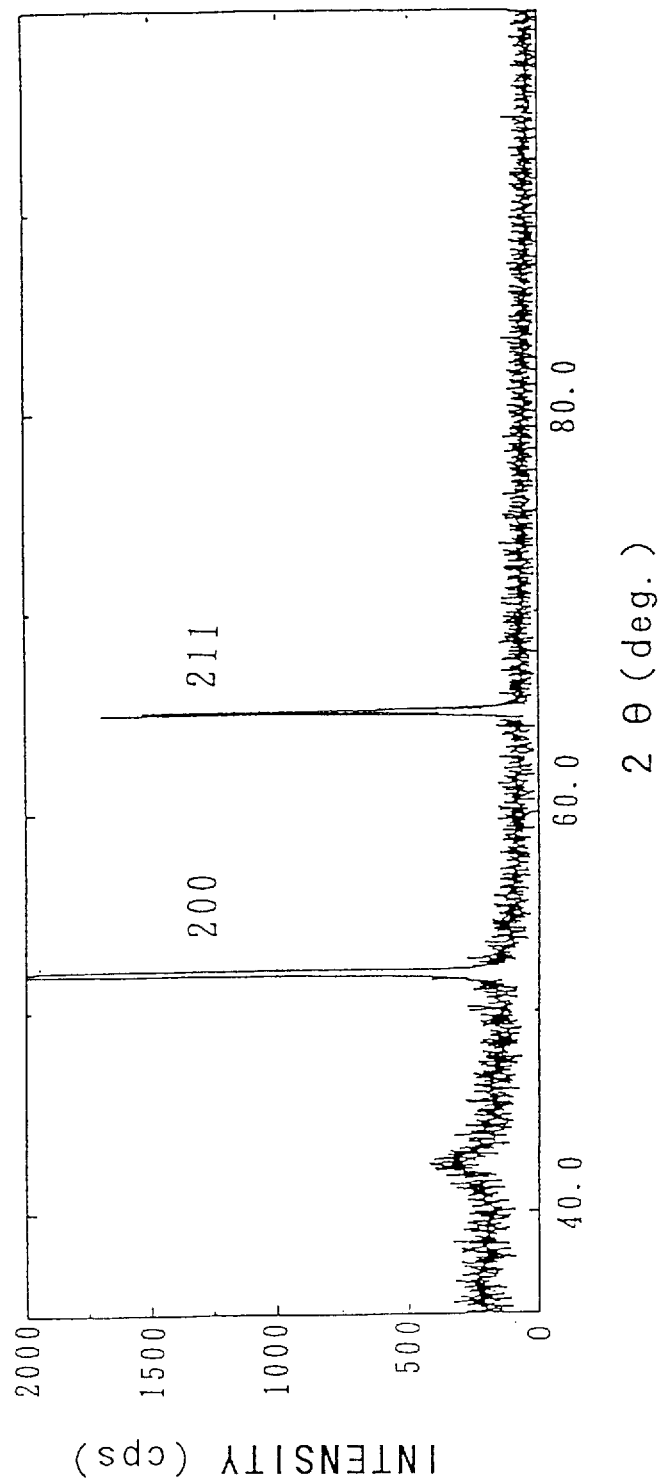
FIG. 3 is an X-ray diffraction pattern of a lithium foil used for an anode of a cell in one embodiment of the present invention.

The thus treated lithium foil was likewise subjected to an X-ray analysis using CuKα ray. The obtained diffraction pattern is shown in FIG. 3. As shown, two reflection peaks, one for (200) reflection and the other for (211) reflection, were observed, the peak intensity of the (200) reflection being greater than that of the (211) reflection. No reflection peaks were observed in the high angle region of 2θ=80° or larger. That is, it was confirmed that as a result of pressing, crystal axes of the crystallites in the foil were oriented substantially along a direction normal to the principal surface of the foil. In this case, the peak intensity of the (200) reflection was 7,408 cps, and that of the (211) reflection was 1,692 cps. When these are converted in terms of peak intensity proportions, the peak intensity of the (200) reflection accounts for about 81% of the sum of the peak intensities of all reflection peaks obtained.

Figure 4:
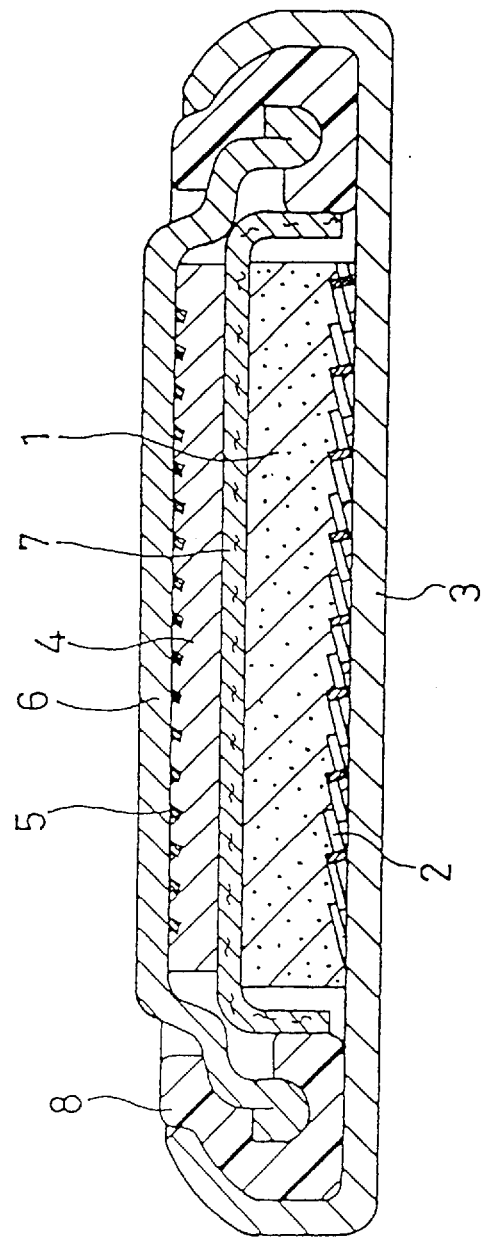
FIG. 4 is a vertical cross-sectional view of a flat-type non-aqueous electrolyte secondary cell used in the same embodiment.

Using the thus press-treated lithium foil, a flat-type non-aqueous electrolyte secondary cell as shown in FIG. 4 was fabricated.

A cathode current collector 2 made of an expanded metal of titanium was placed inside a cathode can 3, and these two members were joined together by spot welding. Next, a predetermined amount of a cathode mixture containing an $LiMn_2O_4$ powder, carbon black and a polytetrafluoroethylene powder was applied on the upper surface of the cathode current collector 2. Then, the cathode current collector 2 with the cathode mixture was pressed so as to form a cathode 1. Then, an anode 4 formed from the press-treated circular lithium foil was adhered by pressing to a seal plate 6 to which an anode current collector 5 made of a nickel expanded metal had been spot-welded. An electrolyte was prepared by mixing propylene carbonate and dimethoxyethane in proportions of 1:1 by volume and dissolving $LiClO_4$ in this solvent in proportions of 1 mole/liter. After placing a separator 7 of polypropylene porous film onto the cathode 1, the electrolyte was injected into the cathode can 3, and the seal plate 6 was fitted into an opening of the cathode can 3 with a gasket 8 interposed therebetween, thus completing the fabrication of the flat-type non-aqueous electrolyte secondary cell.

COMPARATIVE EXAMPLE 1

As a comparative example, a non-aqueous electrolyte secondary cell of the same construction as above was fabricated using a lithium foil not treated by pressing.

Figure 5:
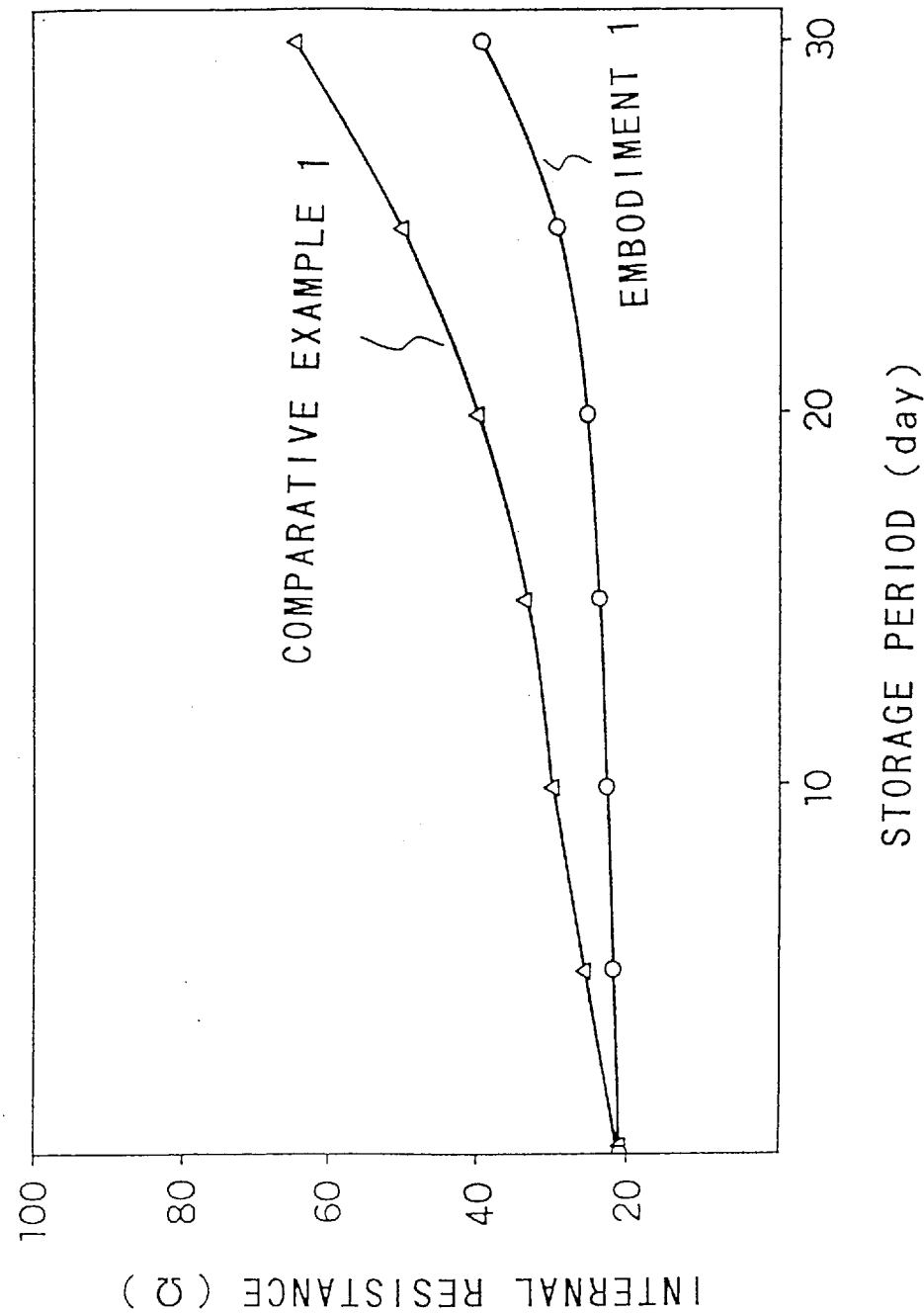
FIG. 5 is a characteristic diagram showing a relation between an internal resistance of the same cell and a storage period at 60° C.

Fifty cells fabricated according to the First Embodiment and as many cells fabricated according to Comparative Example 1 were stored for 30 days at 60° C., and change of cell internal resistance was measured during the storage. FIG. 5 shows a change of cell internal resistance with a storage time. The internal resistances at the end of the 30-day storage period are shown in TABLE 1. Each internal resistance value shown in the table is an average value ±σ (σ is the standard deviation).

TABLE 1

| | CELL INTERNAL RESISTANCE(Ω) |
|---|---|
| EMBODIMENT 1 | 38 ± 5 |
| COMPARATIVE EXAMPLE 1 | 65 ± 12 |

From FIG. 5, it can be seen that the internal resistance of the cell of Comparative Example 1 using a lithium foil not treated by pressing, rises rapidly with storage time. On the other hand, in the cell of the First Embodiment using a press-treated lithium foil, the rise in the internal resistance is suppressed. Further, it is shown in TABLE 1 that in a case of the cell of the First Embodiment, the variation in internal resistance is reduced by half compared to the cell of Comparative Example 1. This means that by the press treatment, the crystallites in the lithium foil can be oriented with their crystal axes, that is along [100] direction, normal to the surface of the foil, thereby suppressing the rise and variation in internal resistance during long-term storage at high temperatures.

Lithium foils, each stamped into a circular shape of 16.8 mm diameter as previously described, were pressed for 10 seconds with the same steel rod jig as mentioned above, using different pressures.

The thus press-treated lithium foils were subjected to the same X-ray analysis. From the analysis, the proportion of the peak intensity of (200) reflection to the sum of the peak intensities of all the reflection peaks obtained by diffraction was found. Further, using these lithium foils as anodes, flat-type non-aqueous electrolyte secondary cells of the same construction as above were fabricated, and their internal resistances were measured after storing them for 30 days at 60° C.

Figure 6:
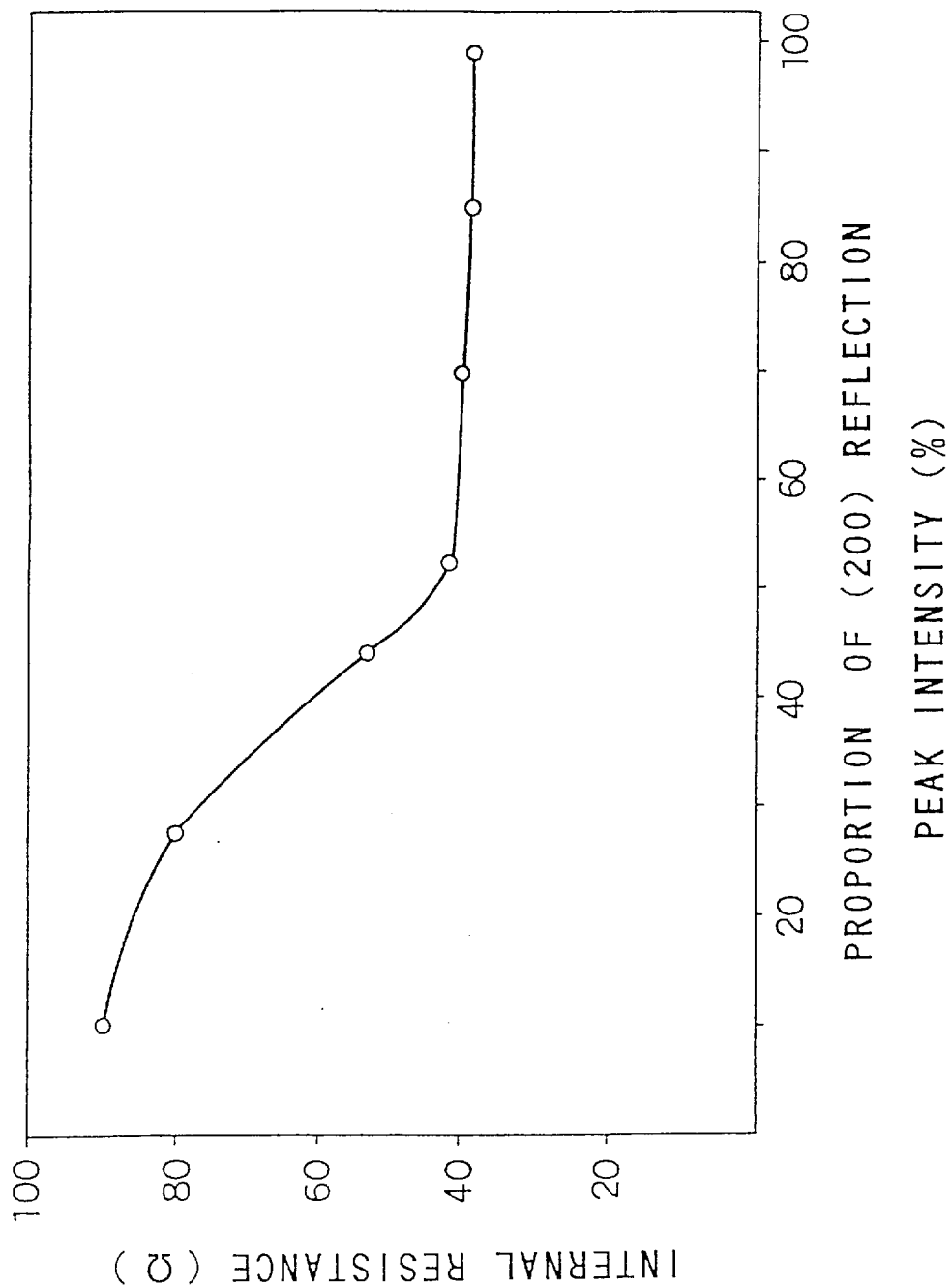
FIG. 6 is a characteristic diagram showing a relation between a proportion of the peak intensity of (200) reflection of an lithium foil and an internal resistance after the storage of the cell in the embodiment using the foil as an anode.

FIG. 6 shows the proportion of the peak intensity of the (200) reflection to the sum of peak intensities of all reflection peaks obtained for each lithium foil, versus the internal resistance of the cell using the lithium foil as an anode, at the end of the 30-day storage.

As can be seen, rise in cell internal resistance is suppressed when the proportion of the peak intensity of the (200) reflection accounts for 50% or more.

Next, using the various lithium foils as the anodes, cells of the same construction as above were fabricated. These cells, five from each group, were subjected to a charge/discharge cycle test in an environment of 60° C. at a current density of 2 $mA/cm^2$, with a discharge lower limit voltage set to 2.0 V and a charge upper limit voltage set to 3.5 V, so as to examine cycle life of each cell. Here, the cell was deemed to reach the end of life when the discharge capacity was reduced to half the capacity measured in the first cycle. Further, in an event that internal short-circuiting occurred because of growth of dendrites during a charge/discharge cycle, it was determined that the life ended with that cycle.

The results are shown in TABLE 2. Each cycle life value in the table indicates an average value ±σ.

TABLE 2

| PROPORTION OF PEAK INTENSITY OF (200) REFLECTION (%) | CYCLE LIFE |
|---|---|
| 11 | 33 ± 11 |
| 28 | 65 ± 16 |
| 52 | 181 ± 17 |
| 70 | 193 ± 18 |
| 85 | 199 ± 20 |
| 96 | 196 ± 15 |

From TABLE 2, it can be seen that the charge/discharge cycle life improves dramatically when the proportion of the peak intensity of the (200) reflection accounts for 50% or more of the sum of the peak intensities of the reflection peaks obtained. It should also be noted that despite the improvement in cycle life, its variation remains essentially the same in absolute value terms. This means that when converted to the ratio to the average value, the variation is greatly reduced.

EMBODIMENT 2

A lithium alloy containing 8 atom % of aluminum was cut into cubes each of 1 $cm^3$. As a result of an X-ray analysis using CuKα ray, reflection peaks due to intermetallic compounds such as $Al_2Li_3$ and $Al_4Li_9$ were slightly observed, but as a whole, a diffraction pattern formed essentially from metal lithium of body centered cubic structure was obtained.

The lithium alloy was pressed flat. When the flat-pressed lithium alloy was subjected to a similar X-ray analysis, the obtained diffraction pattern showed (200) reflection increased in intensity.

Next, the pressure applied to the lithium alloy was varied between 40 to 350 $kgf/cm^2$ to vary the proportion of the reflection peak of the (200) reflection to the sum of the peak intensities. Here, the sum of the peak intensities means the sum taken for the reflection peaks due to metal lithium and aluminum/lithium solid solutions, and the reflection peaks due to aluminum-based intermetallic compounds such as described above were excluded.

The flat-pressed lithium alloy was sliced into pieces each 1 mm in thickness. Each slice was stamped into a circular shape of 16.8 mm diameter and used as an anode to fabricate a flat-type non-aqueous electrolyte secondary cell of the same construction as the cell in the First Embodiment.

These cells, five from each group, were subjected to a charge/discharge cycle test in an environment of 60° C. at a current density of 2 mA/cm$^2$, with a discharge lower limit voltage set to 2.0 V and a charge upper limit voltage set to 3.5 V, so as to examine a cycle life of each cell. Here, the cell was deemed to reach the end of life when the discharge capacity was reduced to half the capacity measured in the first cycle. Further, in the event that internal short-circuiting occurred because of growth of dendrites during a charge/discharge cycle, it was determined that the life ended with that cycle. The results of the cycle tests of these cells are shown in TABLE 3. Each cycle life value here indicates the average value ±σ.

TABLE 3

| PROPORTION OF PEAK INTENSITY OF (200) REFLECTION (%) | CYCLE LIFE |
|---|---|
| 17 | 35 ± 12 |
| 38 | 68 ± 17 |
| 55 | 188 ± 18 |
| 70 | 199 ± 19 |
| 82 | 203 ± 21 |
| 93 | 198 ± 15 |

From TABLE 3, it can be seen that the charge/discharge cycle life improves dramatically when the proportion of peak intensity of the (200) reflection exceeds 50% accounts for or more of the sum of the peak intensities of all the reflection peaks obtained. It is also shown that, as in the First Embodiment, the variation of the cycle life is suppressed despite the improved number of cycles.

EMBODIMENT 3

A lithium foil with a thickness of 300 μm and a width of 22 mm was used as an active material. First, the lithium foil, upon delivery, was subjected to an X-ray analysis, as in the First Embodiment. From the X-ray diffraction pattern obtained by projecting CuKα ray onto the lithium foil at an angle normal to the surface of the lithium foil, it was confirmed that the whole structure consisted of metal lithium of body centered cubic structure and there was no specific orientation for any crystal plane.

This lithium foil was stamped into a circular shape of 16.8 mm diameter. Further, using a steel rod jig, its mirror-polished bottom face was pressed onto the lithium foil, thus pressing the lithium foil for 10 seconds with a pressure of 150 kgf/cm$^2$. After pressing, the lithium foil was heat-treated in a vacuum furnace for 20 hours at 170° C.

Figure 7:
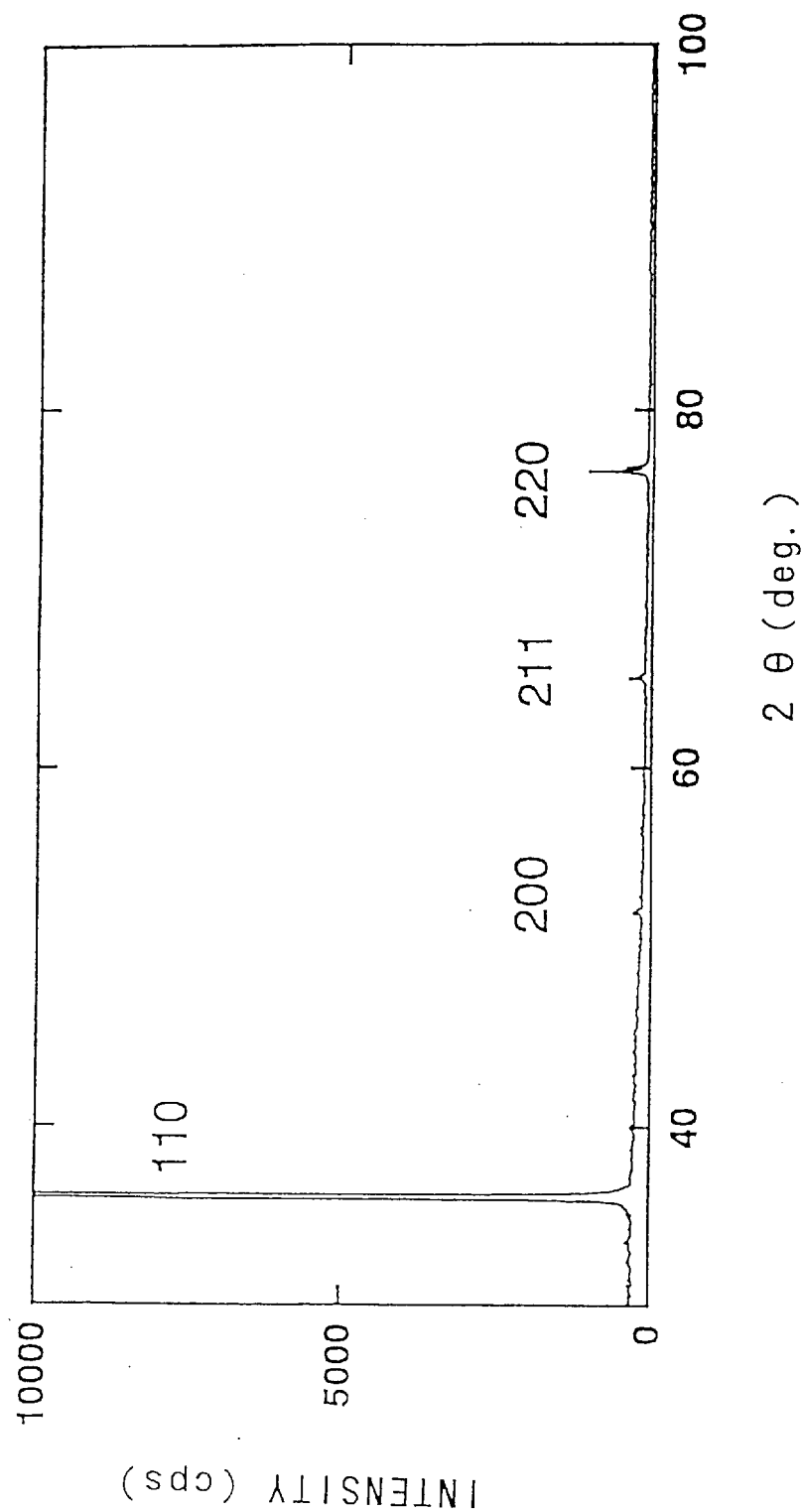
FIG. 7 is an X-ray diffraction pattern of a lithium foil used for an anode of a cell in another embodiment of the present invention.

The lithium foil prepared by pressing followed by heat treatment was likewise subjected to an X-ray analysis using CuKα ray. The obtained diffraction pattern is shown in FIG. 7. As shown, a reflection peak of (110) reflection was greatly increased. This shows that, because of pressing and subsequent heat treatment, the crystallites in the foil were oriented so that the (110) crystal planes were substantially parallel to the principal surface of the sheet. Such a condition was observed on all samples prepared by pressing followed by heat treatment.

A peak intensity of the (110) reflection of the thus treated foil was 23,261 cps, while the peak intensities of (200) reflection, (211) reflection and (220) reflection were 268 cps, 347 cps, and 1,042 cps, respectively. For the (310) reflection (222) reflection, and (321) reflection, peak intensities were approximately the same as the background intensity. From these, the proportion of the peak intensity of the (110) reflection to the sum of the peak intensities of all the reflection peaks obtained was found to be about 93%. Of course, an increase in the peak intensity of the (220) reflection that is the preferential orientation of the (110) planes was also recognized.

Using the pressed and heat-treated lithium foil, a non-aqueous electrolyte secondary cell of the same construction as the First Embodiment was fabricated.

COMPARATIVE EXAMPLE 2

As a comparative example, a flat-type non-aqueous electrolyte secondary cell of the same construction as above was fabricated by using as an anode a lithium foil similar to the one used in the Third Embodiment but not subjected to heat treatment after pressing.

Sixty cells fabricated according to the Third Embodiment and as many cells fabricated according to Comparative Example 2 were charged to a voltage of 4.2 V at three different current densities of 0.5, 1.0 and 2.0 mA/cm$^2$ (20 cells fo reach current density) in an environment of 25° C., and thereafter discharged at a current density of 1.0 mA/cm$^2$ until the voltage dropped to 3.3 V. The discharge capacity of each sample was measured at the end of the discharge. The results are shown in TABLE 4. Each discharge capacity value in the table indicates the average value ±σ.

TABLE 4

| CHARGE RATE | DISCHARGE CAPACITY (mAh) | |
|---|---|---|
| (mA/cm$^2$) | EMBODIMENT 3 | COMPARATIVE EXAMPLE 2 |
| 0.5 | 27 ± 0.8 | 24 ± 1.5 |
| 1.0 | 25 ± 0.9 | 21 ± 1.6 |
| 2.0 | 21 ± 0.8 | 16 ± 1.4 |

From TABLE 4, it can be seen that the cell of the Third Embodiment using the pressed and heat-treated lithium foil exhibits a larger discharge capacity at each charge rate, and a smaller variation in capacity, than the cell of Comparative Example 2. This means that the cell of the Third Embodiment can retain a large discharge capacity even at the increased charge rate.

As described above, by pressing and subsequently heat treating the lithium foil, the (110) planes of the crystallites in the lithium foil can be oriented in parallel to the surface of the foil, which makes it possible to increase the capacity even at the increased charge rate. Furthermore, its variation can be suppressed. That is, when the crystallites in the foil are oriented in this way, rapid charge characteristics of the cell is improved greatly.

Next, various lithium foils differing in the peak intensity of the (110) reflection were prepared by varying the heat treatment condition. Using these lithium foils, non-aqueous electrolyte secondary cells of the same construction as above were fabricated.

These cells, five from each group, were charged to 4.2 V at a current density of 2.0 mA/cm$^2$ in an environment of 25° C., and thereafter discharged at a current density of 1.0 mA/cm$^2$ until the voltage dropped to 3.3 V. The discharge capacity of each cell was measured at the end of the discharge. The results are shown in TABLE 5. Each discharge capacity value in the table indicates the average value ±σ.

TABLE 5

| PROPORTION OF PEAK INTENSITY OF (110) REFLECTION (%) | DISCHARGE CAPACITY (mAh) |
|---|---|
| 17 | 12 ± 1.7 |
| 38 | 14 ± 1.9 |
| 55 | 16 ± 1.8 |
| 72 | 20 ± 1.0 |
| 82 | 20 ± 0.9 |
| 93 | 21 ± 0.8 |

From TABLE 5, it can be seen that when the proportion of the peak intensity of the (110) reflection accounts for 70% or more of the sum of the peak intensities of the reflection peaks obtained, the discharge capacity increases. It is also shown that the variation in the capacity is suppressed, as in the First embodiment.

EMBODIMENT 4

A 300-μm thick lithium foil similar to the one used in the Third Embodiment was passed between a pair of steel rollers so as to roll the foil to have a thickness of about 100 μm. The surfaces of the rollers used were coated with propylene carbonate to prevent the lithium foil from adhering.

Figure 8:
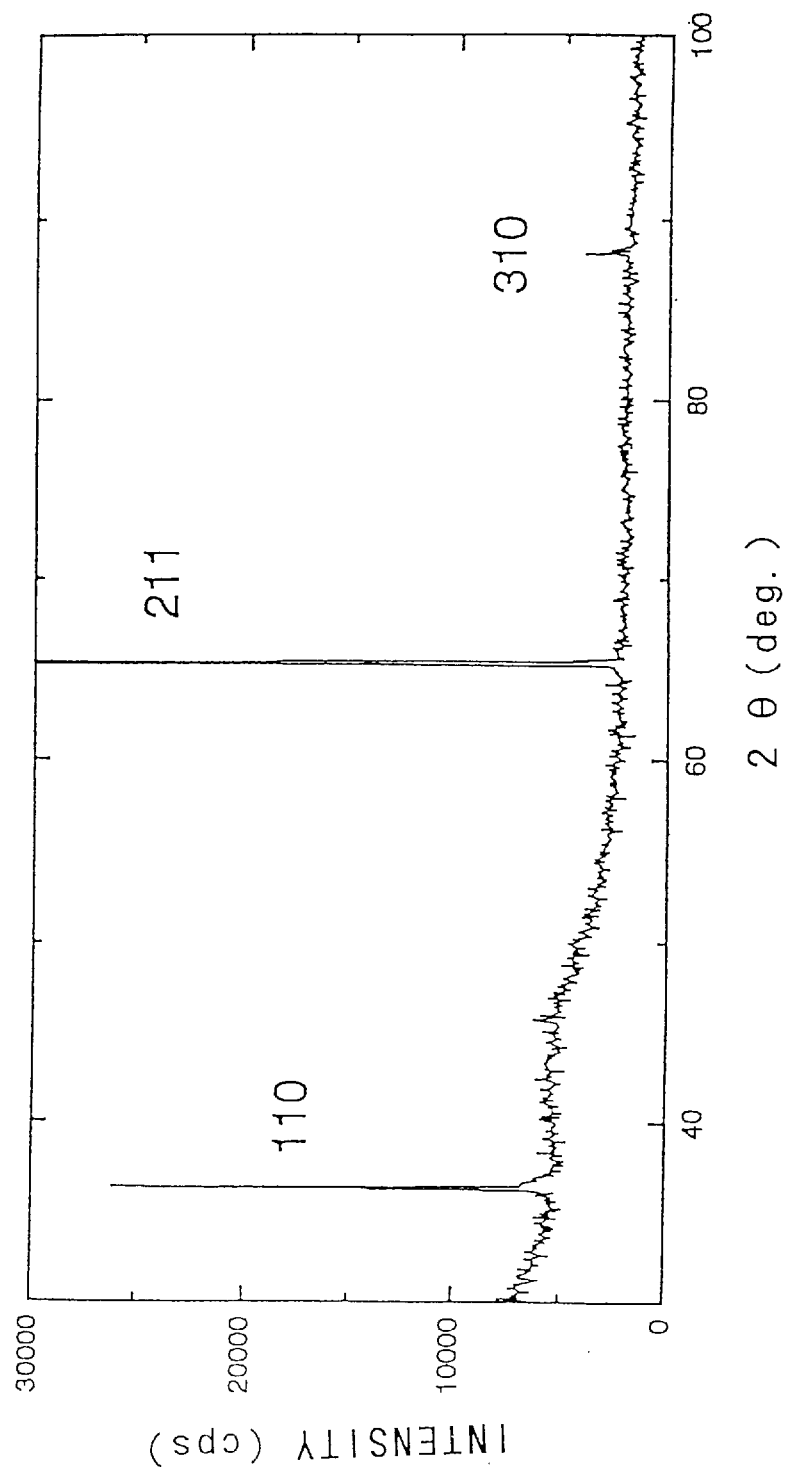
FIG. 8 is an X-ray diffraction pattern of a lithium foil used for an anode of a cell in still another embodiment of the present invention.

The thus rolled lithium foil was subjected to an X-ray analysis using CuKα ray, as in the First Embodiment. One example of the obtained diffraction pattern is shown in FIG. 8. An increase in the intensity of (211) reflection was observed for the lithium foil. This means that (211) planes were oriented in parallel to the surface of the lithium foil. The proportion of the peak intensity of the (211) reflection was 66% of the sum of all peak intensities.

The rolled lithium foil was stamped into a circular shape of 16.8 mm diameter. Using this lithium foil for the anode, a flat-type non-aqueous electrolyte secondary cell of the same construction as the First Embodiment was fabricated. The same cathode, separator and electrolyte as used in the First Embodiment were used herein.

COMPARATIVE EXAMPLE 3

As a comparative example, a flat-type non-aqueous electrolyte secondary cell of the same construction as above was fabricated by using as the anode a lithium foil similar to the one used in the Fourth Embodiment but not treated by rolling.

Fifty cells fabricated according to the Fourth Embodiment and as many cells fabricated according to Comparative Example 3 were charged to 4.2 V at a current density of 1.0 mA/cm$^2$ in an environment of 60° C., and thereafter discharged at a current density of 1.0 mA/cm$^2$ until the voltage dropped to 3.3 V. The ratio of the capacity after discharge to the capacity after charge was calculated in order to determine the charge/discharge efficiency. The results are shown in TABLE 6. Each charge/discharge efficiency value in the table indicates the average value ±σ.

TABLE 6

| | CHARGE/DISCHARGE EFFICIENCY (%) |
|---|---|
| EMBODIMENT 4 | 99.0 ± 0.5 |
| COMPARATIVE EXAMPLE 3 | 96.5 ± 1.3 |

From TABLE 6, it can be seen that the cell of the Fourth Embodiment using the lithium foil treated by rolling achieves a higher charge/discharge efficiency than the cell of Comparative Example 3 using the untreated foil, even at temperatures as high as 60° C. The reason why the cell of Comparative Example 3 is low in charge/discharge efficiency is that high temperatures accelerated a reaction between the electrolyte and the anode, increasing polarization of the anode during discharge. It is therefore presumed that the discharge capacity was reduced because the discharge was stopped when the voltage dropped to 3.3 V. It is thus shown that in the cell of the Fourth Embodiment, the reaction between the electrolyte and the anode was suppressed even under such severe conditions. Furthermore, in the cell of the Fourth Embodiment, the variation in charge/discharge efficiency is also reduced compared to the cell of Comparative Example 3.

This shows that, by orienting the crystallites in the lithium foil so that the (211) planes are essentially parallel to the surface of the foil, the deterioration of the charge/discharge efficiency and its variation at high temperatures can be suppressed. As for the degree of crystal orientation, as a result of a similar study to that conducted in the First Embodiment, it became apparent that an enormous effect can be obtained when the proportion of the peak intensity of the (211) reflection accounts for 50% or more.

EMBODIMENT 5

A 300-μm thick lithium foil similar to the one used in the Third Embodiment was used as the starting material for the active material. This lithium foil was stamped into a circular shape of 16.8 mm diameter. Next, the circular lithium foil was heat-treated for 20 hours at 170° C. Then, using a steel rod jig, its mirror-polished bottom face was pressed onto the lithium foil, thus pressing the lithium foil for 10 seconds with a pressure of 270 kgf/cm$^2$.

Figure 9:
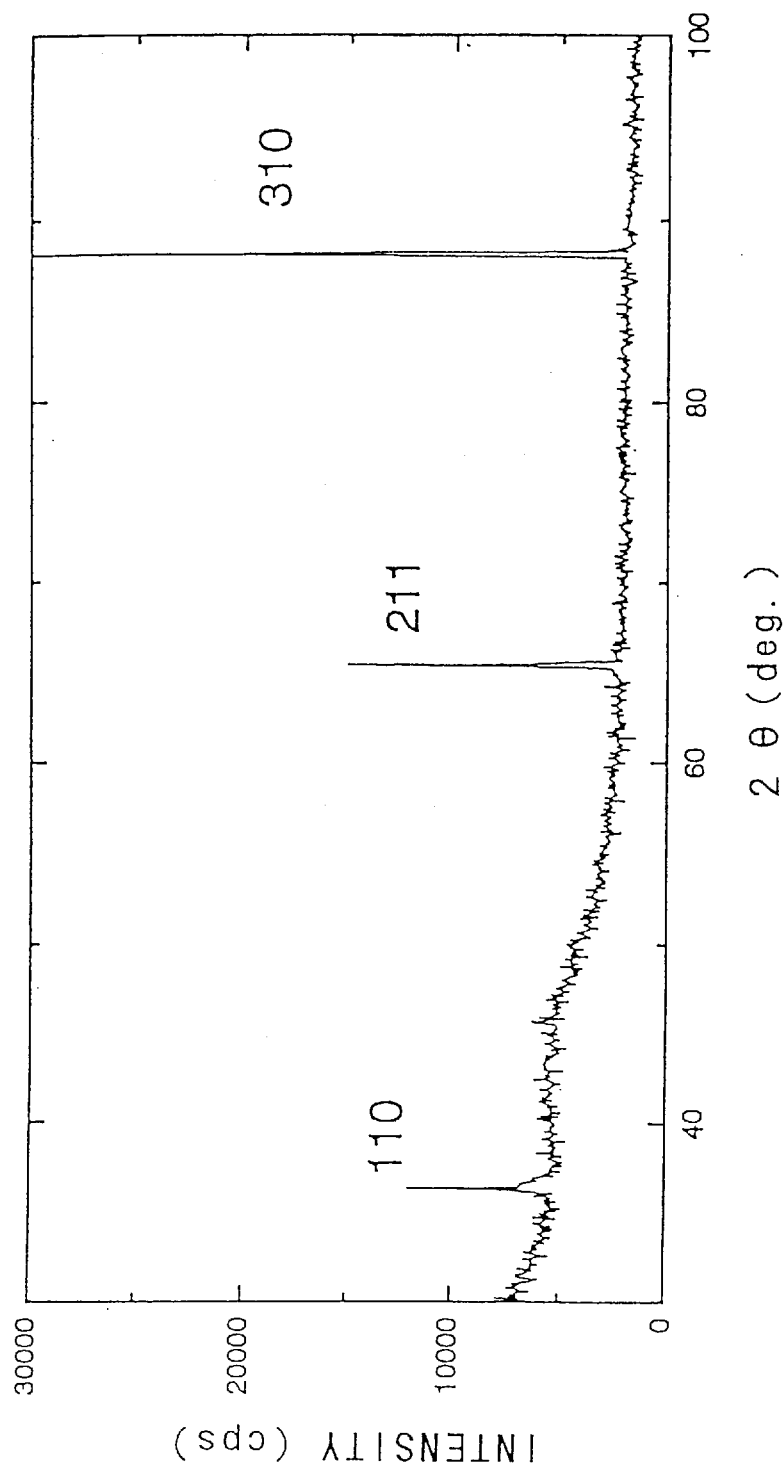
FIG. 9 is an X-ray diffraction pattern of a lithium foil used for an anode of a cell in still another embodiment of the present invention.

The thus treated lithium foil was likewise subjected to an X-ray analysis using CuKα ray. The obtained diffraction pattern is shown in FIG. 9. In this lithium foil, (310) planes of the crystallites were observed to be oriented in parallel to the surface of the foil. The proportion of its peak intensity was 53% of the sum of all peak intensities.

Using the lithium foil heat-treated and pressed as described above, a non-aqueous electrolyte secondary cell of the same construction as the First Embodiment was fabricated.

COMPARATIVE EXAMPLE 4

As a comparative example, a flat-type non-aqueous electrolyte secondary cell of the same construction as above was fabricated by using an untreated lithium foil as an anode.

Fifty cells fabricated according to the Fifth Embodiment and as many cells fabricated according to Comparative Example 4 were subjected to a charge/discharge cycle test in a low-temperature environment of −20° C. at a current density of 2 mA/cm$^2$, with the discharge lower limit voltage set to 2.0 V and charge upper limit voltage set to 3.5 V, so as to examine a cycle life of each cell. Here, the cell was deemed to reach the end of life when the discharge capacity was reduced to half the capacity measured at the end of the first cycle. Further, in an event that internal short-circuiting occurred because of dendrites growth during a charge/discharge cycle, it was determined that the life ended with that cycle. The results are shown in TABLE 7. Each cycle life value in the table indicates the average value ±σ.

TABLE 7

| | CYCLE LIFE |
|---|---|
| EMBODIMENT 5 | 150 ± 15 |
| COMPARATIVE EXAMPLE 4 | 70 ± 23 |

From TABLE 7, it can be seen that the cell of the Fifth Embodiment using the heat-treated and pressed lithium foil achieves a longer charge/discharge cycle life than the cell of Comparative Example 4 using the untreated foil, even at temperatures as low as −20° C. Furthermore, it is shown that in the cell of the Fifth Embodiment is reduced in the variation in cycle life compared to the cell of Comparative Example 4.

This shows that by orientating the crystallites in the lithium foil, crystal planes thereof are initially not oriented in any specific direction, so that (310) planes are essentially parallel to the surface of the foil, the charge/discharge cycle characteristics at low temperatures can be improved, and at the same time, the variation in cycle life can also be suppressed.

Lithium foils prepared by applying the same heat treatment as above were subjected to a press treatment with different conditions. Using the thus treated lithium foils which differ in the peak intensity of (310) reflection, non-aqueous electrolyte secondary cells of the same construction as above were fabricated.

These cells, five from each group, were subjected to a charge/discharge cycle test in an environment of −20° C., under the same conditions as used in the First embodiment, so as to examine a cycle life of each cell. The results are shown in TABLE 8. Each cycle life value in the table indicates the average value ±σ.

TABLE 8

| PROPORTION OF PEAK INTENSITY OF (310) REFLECTION (%) | CYCLE LIFE |
|---|---|
| 10 | 35 ± 10 |
| 26 | 76 ± 13 |
| 53 | 150 ± 15 |
| 65 | 153 ± 16 |
| 82 | 158 ± 14 |
| 93 | 154 ± 17 |

From TABLE 8, it can be seen that the charge/discharge cycle life is improved dramatically when proportion of peak intensity of the (310) reflection accounts for 50% or more to the sum of the peak intensities of the reflection peaks obtained. It should also be noted that despite the improvement in cycle life, the variation remains essentially the same in absolute value terms. This means that when converted to the ratio to the average value, the variation is greatly reduced.

EMBODIMENT 6

A lithium foil similar to the one used in the Third Embodiment was sandwiched between steel block pieces and pressed with a pressure of 200 kgf/cm$^2$. In this condition, the lithium foil was heat-treated in a vacuum furnace for 10 hours at 170° C.

The lithium foil thus pressed and heat-treated simultaneously was subjected to an X-ray analysis in the same manner as described above. In this embodiment, the crystallites in the lithium foil were observed to be oriented so that (321) planes were substantially parallel to the surface of the foil. The proportion of its peak intensity was 62% of the sum of all peak intensities.

The lithium foil thus pressed and heat-treated simultaneously was stamped into a circular shape of 16.8 mm diameter. Using this lithium foil as an anode, a flat-type non-aqueous electrolyte secondary cell of the same construction as the First Embodiment was fabricated.

COMPARATIVE EXAMPLE 5

As a comparative example, a flat-type non-aqueous electrolyte secondary cell of the same construction as the Sixth Embodiment was fabricated using a lithium foil similar to the above but not subjected to the above treatments.

Ten cells fabricated according to the Sixth Embodiment were discharged at a current density of 1 mA/Cm$^2$ with the end voltage set to 2 V, in order to measure the discharge characteristics of each cell immediately after fabrication. Further, 40 cells fabricated according to the Sixth Embodiment and as many cells fabricated according to Comparative Example 5 were stored for 30 days in an environment of 60° C., and then discharged again in the same manner as above, so as to examine a discharge characteristic of each cell were measured. The voltage changes measured are shown in FIG. 10. The discharge capacities are shown in TABLE 9. Each value in the table indicates the average value ±σ.

TABLE 9

| | DISCHARGE CAPACITY (mAh) |
|---|---|
| EMBODIMENT 6 | 24 ± 1.0 |
| COMPARATIVE EXAMPLE 5 | 16 ± 2.5 |

From FIG. 10, it can be seen that the cell of the Sixth Embodiment using the lithium foil pressed and heat treated simultaneously, and stored for 30 days at 60° C., exhibits a smaller voltage fall (voltage delay) at the initial stage of the discharge than the cell of Comparative Example 5. More specifically, the voltage of the cell of Comparative Example 5 falls to about 2.4 V, whereas the voltage of the cell of the Sixth Embodiment falls to about 2.8 V. Furthermore, while the voltage of the cell of Comparative Example 5, after the high-temperature long-term storage, is reduced, the cell of the Sixth Embodiment retains almost the same voltage as the voltage immediately after fabrication even after the high-temperature long-term storage. From TABLE 9, it can be seen that the cell of the Sixth Embodiment has a larger discharge capacity, and a reduced variation of the discharge capacity, as compared to the cell of Comparative Example 5. The larger voltage delay and smaller discharge capacity of the cell of Comparative Example 5 are presumably because of the accelerated reaction between the electrolyte and the anode during the high-temperature long-term storage and the resultant formation of a thick reactant film on the surface of the anode. As a result, it is presumed that polarization of the anode during discharge increased, thereby decreasing the discharge capacity when the end voltage was set to 2 V. More specifically, according to the Sixth Embodiment, even when the cell is stored for a long period in a high-temperature environment of 60° C., the film formed on the surface of the anode is thin, and the deterioration of performance is small.

This shows that, by orienting the crystallites in the lithium foil so that (321) crystal planes are essentially parallel to the surface of the foil, an increase in the voltage delay and a decrease in the discharge capacity after long-term high-temperature storage can be suppressed, and at the same time, the variation in discharge capacity can be reduced.

As for the degree of crystal orientation, as a result of a similar study to that conducted in the First Embodiment it became apparent that an enormous effect can be obtained when the proportion of the peak intensity of the (321) reflection accounts for 50% or more.

EMBODIMENT 7

A lithium alloy containing 7 atom % of aluminum was cut into cubes each of 1 $^3$. The obtained cube was sandwiched and pressed between steel block pieces and heat-treated in this condition, as in the Sixth Embodiment. In the X-ray diffraction pattern obtained from the thus treated lithium alloy by using CuKα ray, reflection peaks due to intermetallic compounds such as $Al_2Li_3$ and $Al_4Li_9$ were slightly observed, but as a whole, it was confirmed that the diffraction pattern was formed essentially from metal lithium of body centered cubic structure. Furthermore, as in the case of metallic lithium, it was confirmed that (321) planes responsible for (321) reflection were oriented parallel to the surface of the foil.

Next, various lithium alloy foils differing in the peak intensity of the (321) reflection were prepared by varying the pressure applied for pressing. Here, the sum of the peak intensities means the sum taken for the reflection peaks obtained from the body centered cubic structure due to metallic lithium and aluminum/lithium solid solutions, and the reflection peaks due to aluminum-based intermetallic compounds such as described above were excluded.

The hot-pressed flat lithium alloy having a 1 mm thick was stamped into a circular shape of 16.8 mm diameter. Using this flat lithium alloy as an anode, a flat-type non-aqueous electrolyte secondary cell of the same construction as the First Embodiment was fabricated.

These cells, five from each group, were stored for 30 days in an environment of 60° C. After storage for 30 days, the cells were discharged at a current density of 1 mA/cm$^2$ until the voltage dropped to 2 V, and the discharge capacity of each cell was measured. The measured results of the discharge capacities of these cells after the long-term storage are shown in TABLE 10. Each value in the table indicates the average value ±σ.

TABLE 10

| PROPORTION OF PEAK INTENSITY OF (321) REFLECTION (%) | DISCHARGE CAPACITY (mAh) |
|---|---|
| 11 | 12 ± 3.1 |
| 28 | 14 ± 2.4 |
| 52 | 24 ± 0.8 |
| 72 | 25 ± 0.9 |
| 85 | 27 ± 0.8 |
| 96 | 30 ± 1.0 |

From TABLE 10, it can be seen that the discharge capacity after long-term storage increases dramatically, and the variation in discharge capacity reduced, when the proportion of the peak intensity of the (321) reflection accounts for 50% or more of the sum of the peak intensity of all the reflection peaks obtained.

EMBODIMENT 8

A lithium foil similar to the one used in the Third Embodiment was stamped into a circular shape of 16.8 mm diameter, and this lithium foil was subjected to an impact load, that is a dynamic load not a static load as applied in the Third Embodiment. More specifically, an impact load of about 30 kgf·m/cm$^2$ was applied by momentarily striking the lithium foil with a steel hammer.

When the same X-ray analysis as conducted in the First Embodiment was performed on the lithium foil subjected to such an impact load by momentary striking, it was found that the peak intensity of (222) reflection accounts for about 55% of the sum of peak intensities of all the reflection peaks obtained.

Using the lithium foil thus subjected to an impact load by striking, a flat-type non-aqueous electrolyte secondary cell of the same construction as the First Embodiment was fabricated.

COMPARATIVE EXAMPLE 6

As a comparative example, a flat-type non-aqueous electrolyte secondary cell of the same construction as above was fabricated using an untreated lithium foil as the anode.

Sixty cells fabricated according to the Eighth Embodiment and as many cells fabricated according to Comparative Example 6 were discharged at a current density of 1.0, 1.5, 2.0 or 3.0 mA/cm$^2$ (15 cells for each current density) in an environment of 25° C. until the voltage dropped to 2.0 V, and the discharge capacity of each sample was measured at the end of the discharge.

The results are shown in TABLE 11. Each value in the table indicates the average value ±σ.

TABLE 11

| DISCHARGE RATE (mA/cm$^2$) | DISCHARGE CAPACITY (mAh) | |
|---|---|---|
| | EMBODIMENT 6 | COMPARATIVE EXAMPLE 5 |
| 1.0 | 25 ± 0.9 | 23 ± 1.5 |
| 1.5 | 23 ± 0.8 | 20 ± 1.7 |
| 2.0 | 20 ± 0.9 | 16 ± 1.6 |
| 3.0 | 15 ± 0.8 | 10 ± 1.5 |

From TABLE 11, it can be seen that the cell of the Eighth Embodiment using the lithium foil subjected to an impact load by striking exhibits a larger discharge capacity at each discharge rate, and a smaller variation in capacity, than the cell of Comparative Example 6 using the untreated lithium foil. This also means that the cell of the Eighth Embodiment can retain a large discharge capacity even at an increased discharge rate.

It is thus shown that, by preferentially orienting the crystallites in the lithium foil so that (222) planes were parallel to the surface of the foil, the capacity can be increased even at an increased discharge rate, and its variation also can be suppressed. This therefore proves effective in quick discharge.

As for the degree of crystal orientation, as a result of a similar study to that conducted in the First Embodiment, it became apparent that an enormous effect can be obtained when the proportion of the peak intensity of (222) reflection accounts for 50% or more.

In the above embodiments, the orientation of crystallites in the lithium foil has been explained based on the peak intensity of an X-ray reflection from a specific set of crystal planes where the reflection is obtained by X-ray diffraction. Alternatively, the crystallites may be oriented so that such crystal planes where no reflections are obtained by X-ray diffraction because of extinction rule are parallel to the surface of the foil.

In an untreated lithium foil, the orientation of crystallites is random, but as explained in the above embodiments, by applying a pressing treatment, the crystallites in the foil can be oriented along a specific direction.

The above embodiments have dealt with secondary cells, but primary non-aqueous electrolyte cells which ensure a high efficiency and an enhanced safety under severe conditions can also be obtained, according to the present invention.

Furthermore, the above embodiments have been described as using metal lithium and lithium-aluminum compounds as the anode active materials, but it will be recognized that the same effects can be obtained if an alkali metal other than lithium, such as sodium or potassium, or an alloy containing such metals is used for the anode, as long as the crystal structure of such materials has body centered cubic and preferential orientation of each crystal plane is recognizable.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An anode for a non-aqueous electrolyte cell comprising a sheet mainly composed of an alkali metal as an active material, wherein a peak intensity of one reflection selected from the group consisting of a (200) reflection, a (211) reflection, a (310) reflection, a (321) reflection and a (222) reflection obtained from an incident X-ray at an angle normal to a principal surface of said sheet, accounts for 50% or more of a sum of peak intensities of reflections obtained from said incident X-ray.

2. An anode for a non-aqueous electrolyte cell comprising a sheet mainly composed of an alkali metal as an active material, wherein a peak intensity of (110) reflection obtained from an incident X-ray at an angle normal to a principal surface of said sheet accounts for 70% or more of a sum of peak intensities of reflections obtained from said incident X-ray.

3. A method of manufacturing an anode for a non-aqueous electrolyte cell comprising a step of pressing a foil mainly composed of an alkali metal as an active material from a direction normal to a principal surface thereof.

4. The method of manufacturing an anode for a non-aqueous electrolyte cell in accordance with claim 3, further comprising a step of heat-treating the pressed foil at a temperature lower than the melting point of said alkali metal.

5. The method of manufacturing an anode for a non-aqueous electrolyte cell in accordance with claim 3, further comprising a step of heat-treating said foil at a temperature lower than the melting point of said alkali metal before the step of pressing said foil.

6. The method of manufacturing an anode for a non-aqueous electrolyte cell in accordance with claim 3, wherein in the step of pressing said foil, said foil is heat-treated at a temperature lower than the melting point of said alkali metal while being pressed.

7. The method of manufacturing an anode for a non-aqueous electrolyte cell in accordance with claim 3, wherein in the step of pressing said foil, said foil is rolled by being passed through a gap between a pair of rollers arranged parallel to each other.

8. The method of manufacturing an anode for a non-aqueous electrolyte cell in accordance with claim 3, wherein in the step of pressing said foil, an impact load is applied onto the principal surface of said foil.

* * * * *